Jan. 22, 1952   J. K. SHANNON   2,583,125
LANDING RETARDER FOR MODEL PLANES
Filed Oct. 9, 1947   2 SHEETS—SHEET 1

INVENTOR
JOHN K. SHANNON
BY
ATTORNEYS

Jan. 22, 1952  J. K. SHANNON  2,583,125
LANDING RETARDER FOR MODEL PLANES
Filed Oct. 9, 1947  2 SHEETS—SHEET 2
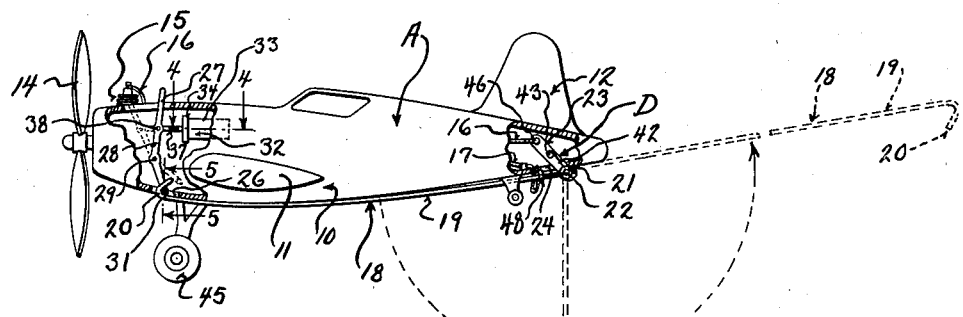
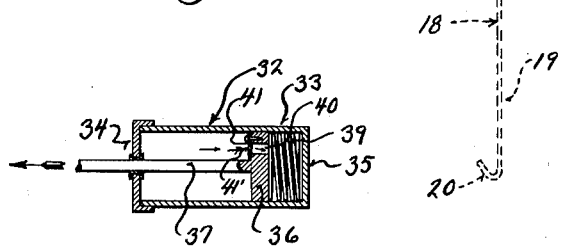
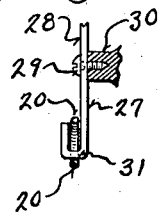
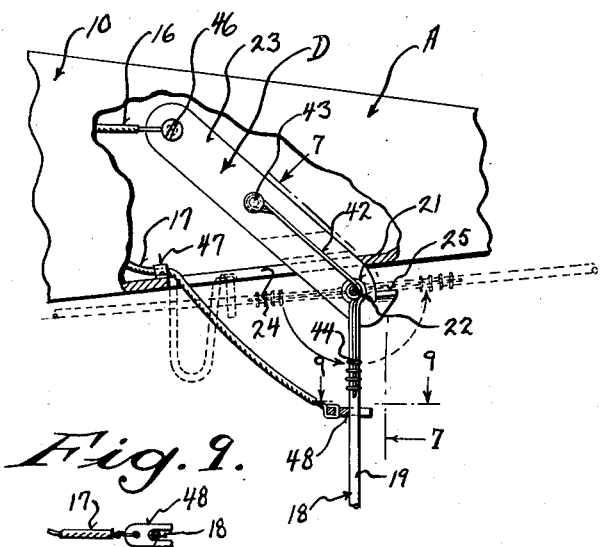
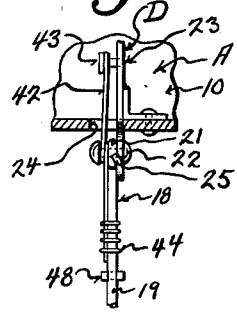
INVENTOR
JOHN K. SHANNON
BY
ATTORNEYS Patented Jan. 22, 1952

2,583,125

UNITED STATES PATENT OFFICE 2,583,125

LANDING RETARDER FOR MODEL PLANES

John K. Shannon, Kenosha, Wis.

Application October 9, 1947, Serial No. 778,822

3 Claims. (Cl. 46—78)

This invention appertains to aircraft and more particularly to toy or model power controlled airplanes.

One of the primary objects of my invention is to provide a unique means for arresting landings of powered, line controlled model airplanes, whereby to simulate aircraft carrier landings and to increase the pleasure and sport of motor airplane flying.

Another salient object of my invention is to provide a landing hook pivotally carried by the fuselage of the plane adapted to be automatically released after the elapse of a pre-determined time interval, whereby to permit the hook to swing down below the landing gear in such a position, that the same can engage a suitable arresting gear on the ground, when the plane is guided to such arresting gear by the manipulator of the plane.

A further important object of my invention is the provision of means for automatically cutting out the engine of the model plane when the hook engages the arresting gear, so as to insure the proper landing of the plane.

A further object of my invention is to provide a simple, compact and sturdy means for associating the hook with the fuselage, whereby the same will be normally in an out of the way position, and whereby the swinging of the hook when the same engages the arresting gear will be limited so as to prevent the nosing over of the plane.

A still further object of my invention is to provide a simple but efficient type of arresting gear for the plane.

With these and other objects in view, the invention consists in the novel construction, arrangement and the formation of parts as will be hereinafter more specifically described, claimed and illustrated in the accompanying drawings, in which drawings:

Figure 3 is a side elevational view of the model line controlled airplane equipped with my invention, the view being partly broken away and in section to illustrate structural detail, the view also showing in full lines the normal position of the landing hook, and in dotted lines, the position of the hook for engaging the arresting gear and after engaging the arresting gear.

Figure 4 is an enlarged, detail, longitudinal, sectional view taken on the line 4—4 of Figure 3 looking in the direction of the arrows, illustrating one form of timing mechanism which can be utilized for releasing the landing hook.

Figure 5 is a detail, vertical, sectional view taken on the line 5—5 of Figure 3 showing means for releasably holding the hook in its normal position.

Figure 6 is an enlarged, fragmentary, side elevational view of the tail end of the airplane with parts thereof broken away in section, illustrating the mounting of the landing hook and the means employed for breaking the circuit to the ignition system of the engine of the plane.

Figure 7 is a detail, vertical, sectional view taken on the line 7—7 of Figure 6 looking in the direction of the arrows.

Figure 8 is a detail, horizontal, sectional view, illustrating the pivot for the landing hook and the means for limiting the rearward swinging movement of the landing hook.

Figure 9 is a fragmentary, detail, sectional view taken on the line 9—9 of Figure 6 looking in the direction of the arrows and showing the detachable electrical connection between the landing hook and a part of the ignition system for the engine.

Referring to the drawings in detail, wherein similar reference characters designate corresponding parts throughout the several views, the letter A generally indicates a model airplane equipped with my landing device D.

Figure 1:
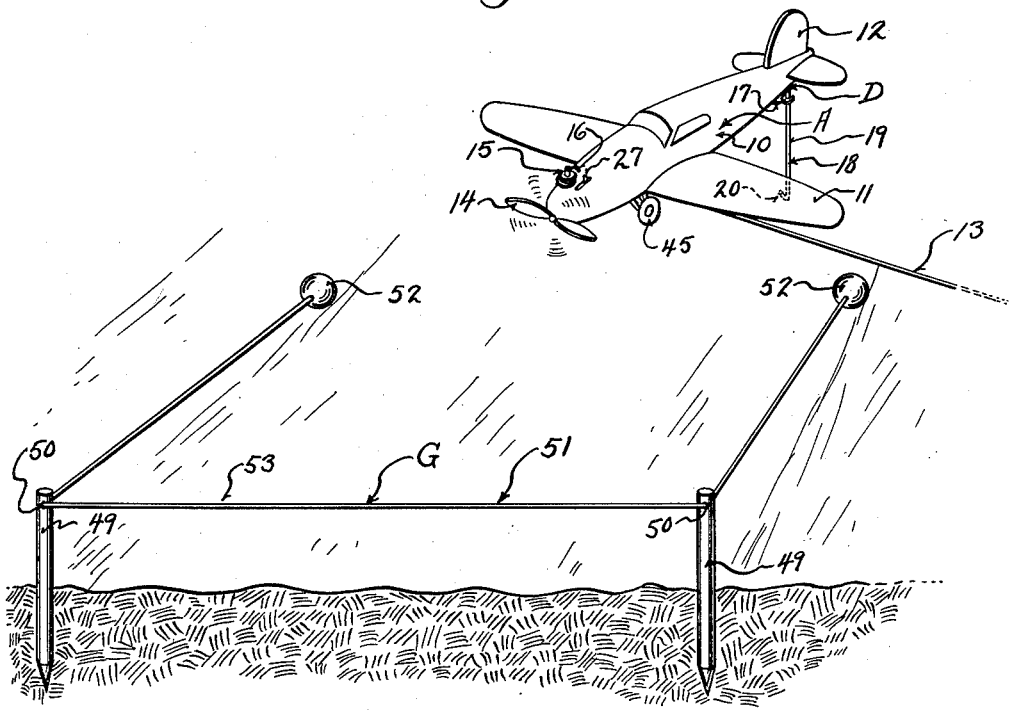
Figure 1 is a perspective view showing a powered, line controlled model airplane, equipped with my invention, approaching the arresting gear.

The model airplane A can be any preferred type of powered, line controlled model plane now generally used by model clubs, and hence, the airplane itself will not be described in minute detail, but it is to be understood that the same is of the character in which flight is controlled by a line manipulated by a person on the ground. Briefly, the airplane A includes a fuselage 10, wings 11, and a tail or empennage 12. The control line is indicated by the reference character 13. The propeller 14 is driven in the customary manner by a small internal combustion engine 15. The combustion engine 15 is a well known type utilized in model planes and is provided with an ignition system. The ignition system is also of the ordinary character and for the purpose of illustrating that part of my invention for breaking the ignition system, it is to be noted that the same includes electric wires 16 and 17.

In accordance with my invention, I provide a landing hook 18 for the airplane, and this hook includes an elongated shank 19 having a bill 20 on its forward or lower end. The rear end of the hook can be coiled to form an eye 21, through which extends a pivot pin 22. The pivot pin is carried by an electrical conducting, supporting plate 23 rigidly secured to the fuselage near the tail end of the plane. The supporting plate 23 extends through a slot 24 in the fuselage, so that the pivot 22 for the hook will be disposed slightly below the lower surface of the fuselage. This downwardly projecting portion of the plate can be provided with an outturned resilient retaining lip 25, for the purpose which will later appear.

From the description so far it can be seen that the landing hook 18 is pivoted to the tail end of the body and can be swung under the fuselage in close engagement therewith, and in fact, the shank 19 of the hook can be curved to conform to the configuration of the fuselage. Obviously, the hook can be pivoted to the supporting plate in any preferred way.

When the hook is swung up into engagement with the outer lower surface of the fuselage, the bill 20 thereof can extend into the fuselage through a slot 26 formed in said fuselage.

A latch 27 is provided for normally holding the hook in its raised, inoperative, out of the way position. In the present instance, I have shown the latch 27 to include a substantially bell crank shaped lever 28 pivoted at its angle on a pivot pin 29 carried by a bracket 30 which is rigidly secured to the plane.

With the lever 28 in the position shown in full lines in Figure 3 and the hook in its raised position, as is also shown in the full lines, the downward swinging movement of the hook is prevented due to the engagement of a finger 31 on the lever with the bill on the hook.

I provide means for automatically actuating the lever to release the hook after the elapse of a certain pre-determined length of time. For this purpose I provide a timer 32 located in the fuselage adjacent to the engine thereof. While any desired type of timer can be used, I have illustrated one particular type, so that the workings of my invention can be understood. The timer shown includes a cylinder 33 having cylinder heads 34 and 35. The cylinder is rigidly mounted in place on the fuselage. Mounted for reciprocatory movement in the cylinder is a piston 36 having a piston rod 37 extending out through the cylinder head 34. The forward end of the piston rod is pivotally secured as at 38 to latch lever 28 above its pivot 29, so that movement of the piston and piston rod will actuate the lever. An expansion spring 39 is disposed within the cylinder between the head 35 and the piston 36 and normally functions to push the piston and piston rod forwardly to swing the finger 31 from out of engagement with the bill 20 of the hook. The piston itself is provided with a port 40, and the port is controlled by a one way opening flap valve 41. The flap valve is provided with a minute escape orifice 41' which registers with the port 40. The cylinder can be partly filled with a liquid, and as the spring urges the piston forwardly, the fluid escapes at a regular rate through the minute orifice, so that a pre-determined time will elapse before the piston reaches the head 34 to bring about the moving of the latch lever completely out of engagement with the bill hook. Obviously, the piston can be quickly returned to the right (referring to Figure 4) due to the opening of the flap valve when the piston is moved in that direction.

Figure 2:
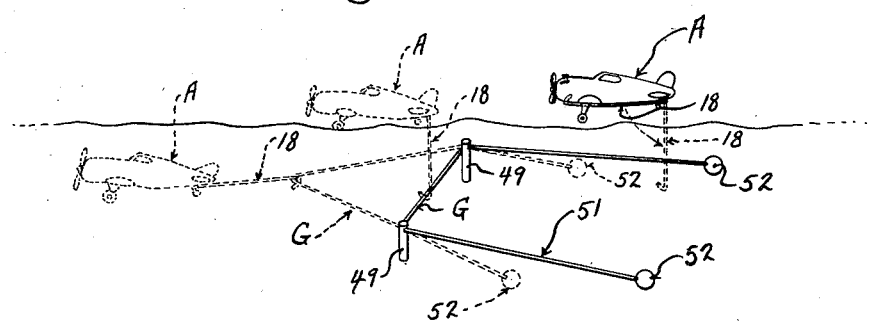
Figure 2 is a perspective view on a smaller scale than Figure 1 and of a diagrammatic nature showing the line controlled model plane approaching the arresting gear and being landed by said gear.

When the hook is released, the same will swing down to a vertical position as illustrated in one dotted line position in Figures 2 and 3, in full line position in Figure 1. In this position the hook is ready to engage the arresting gear G which can be positioned on the ground or any other desired place. This arresting gear G will be later more fully described.

There might be a tendency for the slip stream to swing back the landing hook from its vertical position and I can provide means to overcome this. This means can consist of a light leaf spring 42. One end of the spring is anchored as at 43 to the supporting plate 23, and an intermediate part of the spring extends about the pivot pin 22. The lower end of the spring is fastened as at 44 to the shank 19 of the hook 18. When the hook is in its raised, normal position, this spring is under tension, and when the hook is released by the latch, the spring functions to rapidly lower the hook, and the tension is such that the spring will hold the shank of the hook in substantially a vertical position.

Much stress is laid on the position of the hook and its relation relative to the front landing gear 45 of the airplane A. By referring to Figures 1, 2 and 3, it can be seen that the bill of the hook is a considerable distance below the wheels of the landing gear 45 when the hook is in its lowermost position. Consequently, the hook will be in such a position that the same will readily engage the arresting gear G without interference from the landing gear. Likewise, the carrying of the hook by the tail end of the plane will permit the swinging back of the hook when the same engages the arresting gear, and there will be just enough of a tendency to slightly raise the tail initially, so as to allow the wheels of the landing gear to correctly engage the ground.

The landing hook and its associated members form a part of the ignition circuit for the motor 15, and by referring to Figure 6, it can be seen that the wire 16 of the circuit is grounded as at 46 to the supporting plate 23. The wire 17 is anchored as at 47 to the fuselage 10 adjacent to the slot 24 in such a manner as to leave a part of this wire loose, and the end of this loose wire is electrically connected to a bifurcated contact clip 48 which is sprung on the shank 19 of the landing hook 18. When the hook is swung back to its extreme position after engaging the arresting gear, the contact clip 48 will ride off of the hook, and the circuit to the motor will be broken so as to stop the operation thereof.

While the arresting gear G can be of any desired form, I do lay stress on the simple gear illustrated, and the same forms a part of my invention. As shown, the arresting gear G includes a pair of small pointed posts or pegs 49 which are adapted to be driven into the ground in spaced relation. The upper ends of the pegs are provided with guide eyes or openings 50 through which is threaded the arresting line or cable 51. The ends of the cable or line have secured thereto drag weights 52. In setting up the arresting gear the weights 52 are pulled back so as to leave a taut intermediate section 53 of the line between the pegs 49.

In operation, the hook 18 is swung up against the belly of the airplane A, and the latch lever 27 is manipulated manually so that the foot 31 thereof will engage the bill 20 of the hook 18. The plane is now flown in the usual manner and the person controlling the plane manipulates the same in the ordinary way by the control line 13. After the plane has been in the air the desired length of time, the latch lever will be released by the timer 32, and the hook 18 will swing down to its vertical position. The manipulator now guides the plane toward the ground and between the pegs 49, so that the landing hook will engage the stretch of the line or cable between the pegs. At this time the hook 18 will be pulled back by the line and off of the contact clip 48. The engine 15 will cease operating and the arresting cable or line 51 will effectively arrest the flight of the plane dragging the weights 52 forwardly therewith.

When the bill 20 of the hook 18 engages the cable 51, the hook 18 is pulled back past the resilient retaining lip 25, and the hook is held in its rearmost position trailing the fuselage. The hook extending rearwardly of the fuselage gives a certain desired weight to balance the plane so as to lessen the possibility of the plane nosing over, and the engagement of the hook with the line also aids in preventing the plane from nosing over.

From the foregoing description, it can be seen that I have provided a simple and novel means for landing model, powered, line controlled airplanes which will simulate the landing of airplanes on aircraft carriers.

Changes in details may be made without departing from the spirit or the scope of my invention, but what I claim as new is:

1. In a model, powered, line controlled airplane having a fuselage, landing gear and an engine having an ignition circuit; means for arresting flight of the airplane in landing including a hook pivotally connected at one end of the fuselage adjacent to the tail end of said fuselage and an arresting gear on the ground, said hook embodying an elongated shank and an arresting gear engaging bill, the hook being adapted to normally fit against the fuselage when the airplane is in flight and adapted to swing down below the fuselage and landing gear, time controlled means for releasing the hook to permit the swinging down thereof and means for breaking the circuit to the engine when the hook engages the arresting gear on the ground.

2. In a model, powered, line controlled airplane having a fuselage, landing gear and an engine having an ignition circuit; means for arresting flight of the airplane in landing including a hook pivotally connected at one end of the fuselage adjacent to the tail end of said fuselage and an arresting gear on the ground, said hook embodying an elongated shank and a cable engaging bill, the hook being adapted to normally fit against the fuselage when the airplane is in flight and adapted to swing down below the fuselage and landing gear in another one of its positions, time controlled means for releasing the hook to permit the swinging down thereof, said arresting gear including a cable adapted to be engaged by said hook when the same is in its lowered position, and means for breaking the ignition circuit of the engine when the hook engages the arresting gear.

3. In a model, powered, line controlled airplane having a fuselage, landing gear and an engine having an ignition circuit; means for arresting flight of the airplane in landing including a hook pivotally connected at one end of the fuselage adjacent to the tail end of said fuselage and an arresting gear on the ground, said hook being adapted to normally fit against the fuselage when the airplane is in flight and adapted to swing down below the fuselage and landing gear, time controlled means for releasing the hook to permit the swinging down thereof, said arresting gear including a cable adapted to be engaged by said hook when the same is in its lowered position, means for breaking the ignition circuit of the engine when the hook engages the arresting gear, said means for breaking the ignition circuit including a compact clip normally in frictional engagement with the landing hook.

JOHN K. SHANNON.

REFERENCES CITED

The following references are of record in the file of this patent:

UNITED STATES PATENTS

| Number | Name | Date |
|---|---|---|
| 1,151,419 | Thaw | Aug. 24, 1915 |
| 1,749,438 | Minshall | Mar. 4, 1930 |
| 1,908,408 | Cox | May 9, 1933 |
| 2,207,189 | Austin et al. | July 9, 1940 |
| 2,277,882 | Quady | Mar. 31, 1942 |
| 2,375,443 | Sarchet | May 8, 1945 |

FOREIGN PATENTS

| Number | Country | Date |
|---|---|---|
| 811,422 | France | Jan. 14, 1937 |